July 3, 1945.  F. ABELL  2,379,404
VEHICLE SPEED RECORDING APPARATUS
Filed June 28, 1941  2 Sheets-Sheet 1
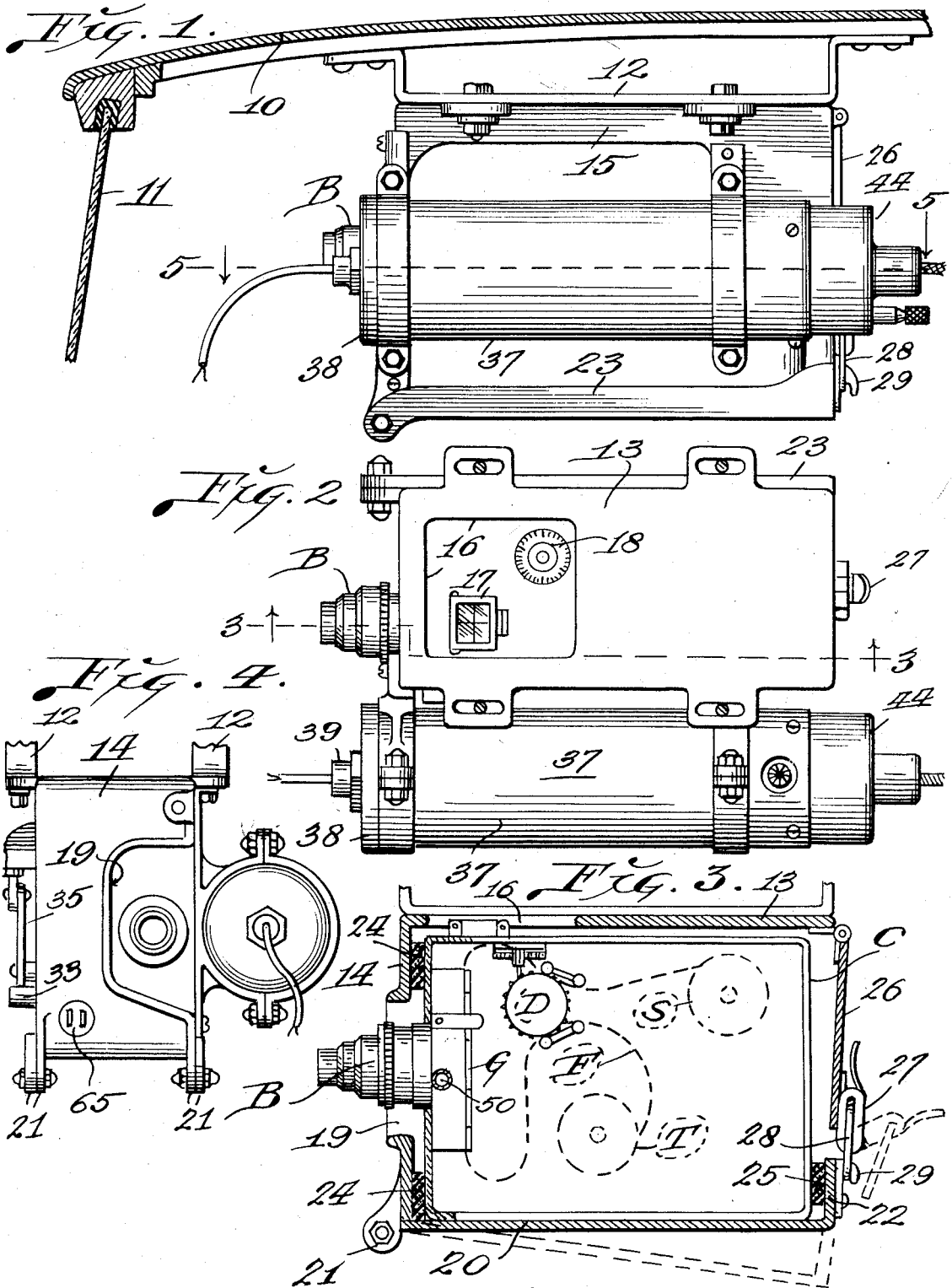

July 3, 1945.  F. ABELL  2,379,404
VEHICLE SPEED RECORDING APPARATUS
Filed June 28, 1941   2 Sheets-Sheet 2

INVENTOR:—
FRANK ABELL.
By Martin P. Smith, ATTY.

Patented July 3, 1945

2,379,404

UNITED STATES PATENT OFFICE 2,379,404

VEHICLE SPEED RECORDING APPARATUS

Frank Abell, Inglewood, Calif.

Application June 28, 1941, Serial No. 400,185

9 Claims. (Cl. 88—16)

My invention relates to an apparatus for photographically recording the speed of motor vehicles, and the subject matter of this application is a continuation-in-part of my copending application on Speed recording method and device, filed August 16, 1937, Serial No. 159,367 and which resulted in Patent Number 2,250,442 dated July 29, 1941.

The principal object of my invention is to provide a simple, practical and inexpensive apparatus or device for practicing the method forming the subject matter of my aforesaid patent.

My invention is of particular use in making photographic records of events concerning the operation of motor vehicles upon streets or highways and which records may be used in court as evidence to prove the actions of the driver of a recklessly driven vehicle, the exact positions and conditions of the street or road traversed by the photographed vehicle, also the speed of the driven car and the time of day that the records were made.

The records made with my improved apparatus materially aid the hearing and prosecution of traffic cases inasmuch as a judge or jury would need very little, if any, corroborating evidence in the matter after viewing the pictures showing exactly what took place and particularly the speed of the photographed vehicle.

The apparatus involving my invention may be mounted upon any type of vehicle adapted to follow and trail another vehicle, and the recording apparatus includes a conventional form of motion picture camera capable of making a single exposure or a series of exposures in rapid succession on a film. The apparatus may be mounted within the vehicle, preferably above the driver's seat, or it may be mounted on the exterior of the trailing vehicle so that in either event, a clear unobstructed view may be had of the vehicle that is being followed. The invention, however, is not limited to land vehicles for it is contemplated to use the invention for determining the speed of aircraft, as well as watercraft.

The photographing means or motion picture camera is provided with a main lens for focusing upon the film, the principal or main object to be recorded and said apparatus also including an auxiliary lens cooperating with reflecting surfaces to simultaneously focus on the frames or exposures of the film, in a relatively small area thereof, speed indicating means which may cover only a fractional part at one side or corner of the scene brought into focus by the main lens.

It is preferable to arrange the auxiliary lens and the reflecting surfaces so that the images produced thereby appear in the sky section of the main picture so as not to interfere with the vehicle that is photographed by the main lens.

A conventional diaphragm and rotary shutter cause the images from both lenses to simultaneously be recorded upon the same moving film in successive exposures.

The speed indicating means may include a speedometer and a chronometer, for instance, a watch having one hand for indicating split seconds, and which speed and time measuring devices are both illuminated while the camera is in action.

One of the objects of my invention is to provide a simple, practical and inexpensive frame that may be mounted within or upon a vehicle for firmly holding the camera and other parts of the apparatus in proper operative position and which frame is capable of being readily opened so as to permit the camera to be easily and quickly placed in position within or removed from the frame.

A further object of my invention is, to provide simple and efficient means for photographically recording two or more objects which are not ordinarily in the same range of view, but which are clearly focused upon the same film so that when the latter is developed it will show a major scene having superimposed thereon a minor scene, and which major and minor scenes in no wise interfere with each other.

A further object of my invention is to provide moving or stationary means capable of determining the speed of a vehicle by taking two pictures thereof at known intervals.

With the foregoing and other objects in view, my invention consists in certain novel features of construction and arrangement of parts that will be hereinafter more fully described and claimed and illustrated in the accompanying drawings in which:

Fig. 1 is a vertical section taken through the front portion of the top of a vehicle and the upper portion of the windshield and showing my improved speed recording apparatus in position for use.

Fig. 2 is a plan view of the apparatus.

Fig. 3 is a vertical longitudinal section taken approximately on the line 3—3 of Fig. 2.

Fig. 4 is a front elevational view of the apparatus.

Figure 5:
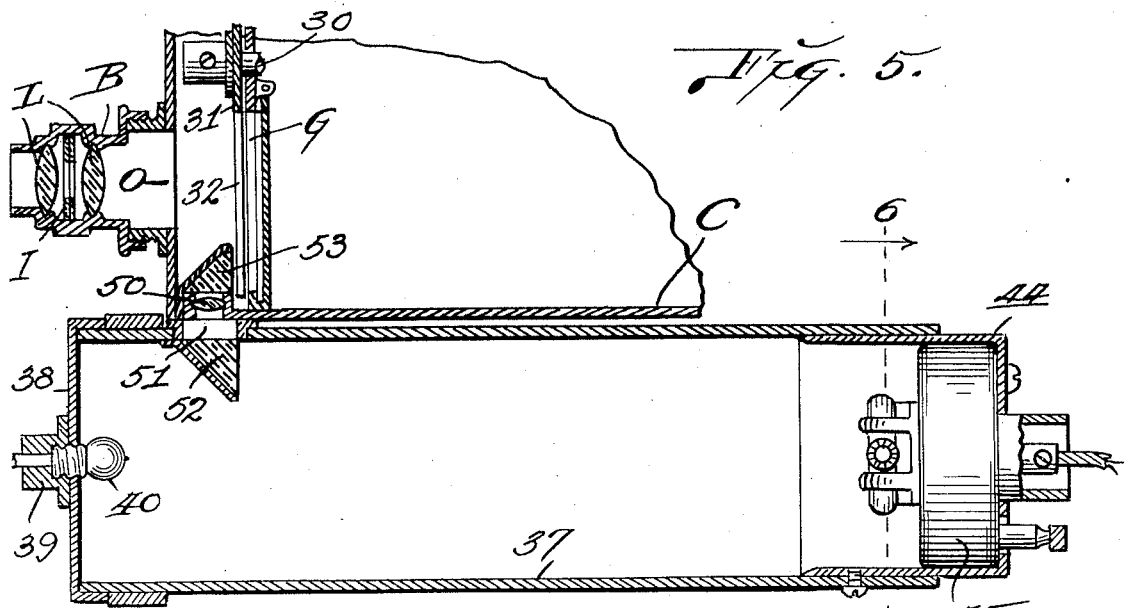
Fig. 5 is an enlarged horizontal section taken on the line 5—5 of Fig. 1.
Figure 6:
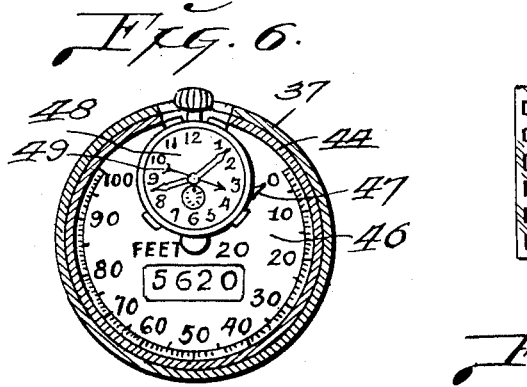
Fig. 6 is a cross section taken on the line 6—6 of Fig. 5.
Figure 7:
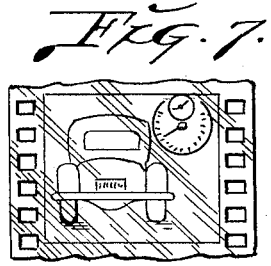
Fig. 7 is a view of one of the frames or exposures that are made on the film with my improved speed recording apparatus.
Figure 8:
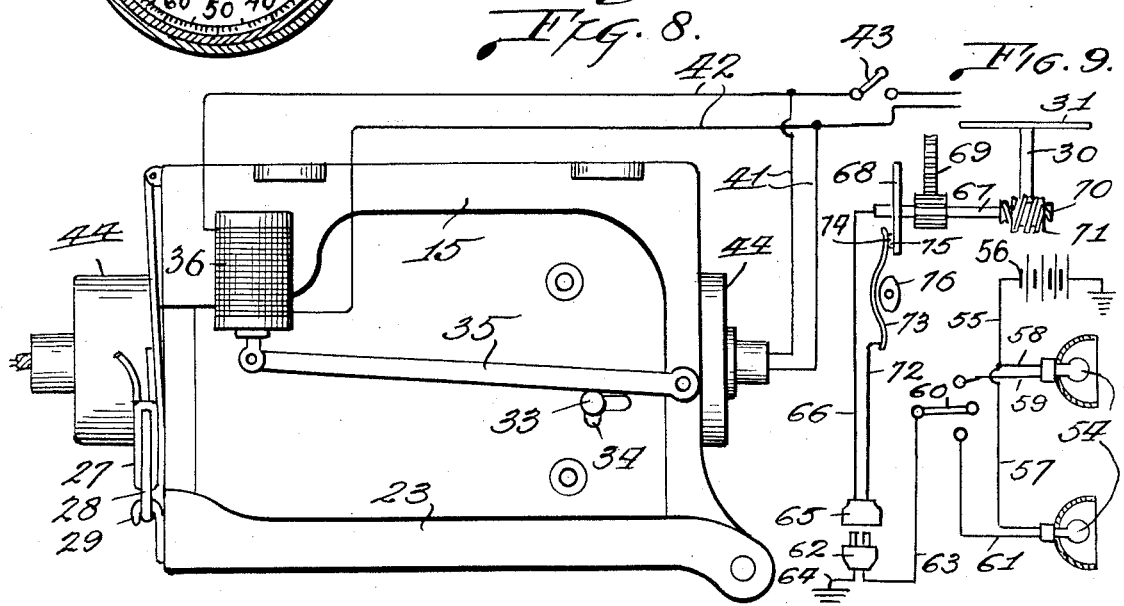
Fig. 8 is a side elevational view of the apparatus showing the mechanical means utilized for starting the motor that operates the film driving means of the camera and also showing diagrammatically the electrical connections for illuminating the speedometer and chronometer and for electrically effecting the release of the camera motor.

Referring by numerals to the accompanying drawings which illustrate a preferred embodiment of my invention, 10 designates the front portion of the top of a motor vehicle and 11 the upper portion of the windshield. Secured to the under side of the top 10 rearwardly of the windshield is a bracket 12 to which is detachably secured a skeleton frame that serves as a holder for the camera and other parts of the photographic apparatus. This frame comprises a top plate 13, a front plate 14, and longitudinally disposed flanges 15 that depend from the sides of said top plate.

Formed in the forward portion of top plate 13 is an opening 16 for the accommodation of parts of the camera that is positioned within said frame, for instance, the finder 17 and the film meter 18, and formed in the front wall 14 is an opening 19 for the accommodation of the lens barrel of the camera.

A bottom plate 20 for the camera holding frame has its forward end connected by hinges 21 to the lower end of front plate 14 and projecting upwardly from the rear end of this bottom plate 20 is a transversely disposed flange 22. Longitudinally disposed flanges 23 project upwardly from the sides of bottom plate 20.

Applied to the inner face of the front plate 14 adjacent its upper and lower edges are strips or blocks 24 of rubber or the like and which provide cushions for the front end of the camera when positioned in the frame. A similar cushion 25 is secured on the inner face of rear flange 22 for engaging the lower rear side of the camera.

Hinged to the rear end of top plate 13 is a depending bar 26, to the lower end of which is hinged a conventional latch lever 27 that carries a loop 28, the lower end of which is adapted to engage a hook 29 secured to the outer face of flange 22, thus providing simple and efficient means for securing the bottom plate 20 in closed position and holding the camera firmly within the frame. When this latch is released, the bottom 20 may be swung downward on its hinges 21 so as to enable the camera to be easily and quickly positioned within or removed from the frame.

In the accompanying drawings I have illustrated a conventional form of motion picture camera removably positioned within the frame, said camera, which is designated by the letter C, being substantially rectangular in form and provided at its forward end with a lens barrel B containing a pair of spaced lenses L between which is arranged for operation the usual iris I. The inner or rear end of the barrel B surrounds an opening O in the front wall of the camera and positioned within the camera a short distance to the rear of said opening is a vertically disposed guide or throat G for the film F, which latter passes from a spool S over the film driving sprocket D, from thence downwardly through the guide or throat G past the opening O, thence upwardly beneath the driving member D and thence onto the takeup T. The film F, spool S, and takeup T are shown by dotted lines in Fig. 3.

Mounted for rotation within the forward portion of the film housing is a shaft 30 and carried thereby immediately in front of the film guide G is a rotary shutter 31 provided with an opening 32 which, as the shutter rotates, registers with the opening O and thus makes an exposure of the film. Shutter carrying shaft 30 and the film driving sprocket wheel D are driven by a spring motor forming a part of the camera and the operation of which motor is controlled by a pin or button 33 that projects through a slot 34 in the side wall of the camera housing.

This pin or button normally occupies a position at the upper end of the slot 34 and when moved downward and then instantly released, the sprocket D moves the film the distance of one frame downwardly through the film guide or throat and simultaneously the shutter makes one complete rotation, thereby exposing the frame on the film that is directly opposite the opening O. If the pin or button is forced downward and held in such position, the motor of the camera operates shaft 30 so as to rotate the shutter and the sprocket wheel D drives the film so as to intermittently move the same downwardly through the film guide with the result that a series of exposures are sequentially made on the film.

Pin or button 33 is moved downward by means of a lever 35 fulcrumed at one end on the side of the camera enclosing frame and the other end of this lever is pivotally connected to the lower end of the core of a conventional solenoid 36 that is mounted on the side of the frame.

Detachably mounted on one side of the camera containing frame is a horizontally disposed housing 37, preferably tubular in form and provided at its forward end with a removable cap 38 in the center of which is removably seated a plug 39 carrying a small electric lamp 40. This lamp is connected in parallel with the coil of solenoid 36 by conductors 41 and 42, the latter being connected to a suitable source of current supply, for instance, a battery, and the flow of current through said conductors being controlled by a suitable switch 43 which may take the form of a conventional push button.

Thus when the switch is closed the core of the solenoid will be forced downwardly, thereby swinging lever 35 so as to move the pin or button 33 downwardly to release the motor within the camera and at the same time lamp 40 will be lighted.

Removably seated in the rear end of the tubular housing 37 is a cap 44 within which is mounted a conventional speedometer 45, the face of which bears a graduated scale 46 to indicate miles per hour and a hand 47 that cooperates with said graduated scale. Supported directly in front of the upper portion of the speedometer and between the ends of the graduated scale is a chronometer 48, preferably a watch having in addition to the usual minute and hour hands, a hand 49 to indicate split seconds.

The inner surface of the housing 37 and that portion of the cap 44 in front of the speedometer may be coated with white enamel or the like in order to provide maximum illumination of the faces of the speedometer and chronometer by the electric lamp 40.

Located in the side wall of the camera C between the side of the film guide or throat G and the front wall of the camera housing is a lens 50 and formed in the wall of housing 37 in registration with this lens is an opening 51. Suitably mounted within the housing 37 directly over the opening 51 is a right angle prism 52 positioned so as to transmit rays of light from the speedometer and chronometer in the rear end of housing 37 through the opening 51 and through lens 50.

Suitably mounted within the camera immediately adjacent the lens 50 is a right angle prism 53 arranged to transmit light rays received from prism 52 rearwardly so that said rays strike directly against the sensitized surface of the frames of the film passing through guide or throat G.

As a result of this arrangement, the lenses L transmit the main picture that is being photographed onto the film passing through the guide G and a small portion of each frame of the film simultaneously receives images of the speedometer 45 and chronometer 46, which images are transmitted through prism 52, lens 50, and prism 53.

It is to be understood that my improved speed recording device is mounted upon a traffic officer's vehicle and when the traffic officer driving the equipped vehicle notes a car that is being driven recklessly or at high speed, and follows the speeding car, by manipulation of the switch 43 a series of single pictures of the speeding vehicle may be taken at spaced intervals, or by holding the switch closed a series of exposures may be taken so as to ultimately produce a motion picture of the speeding vehicle. Each frame or picture taken will show the speeding vehicle, the road or pavement over which the vehicle is traveling, also adjacent vehicles, and in addition there will appear upon each frame or exposure a picture of the speedometer and chronometer, thus providing a positive record that may be used as evidence in a traffic court for proving the actual speed and movements of the speeding vehicle.

Figure 9:
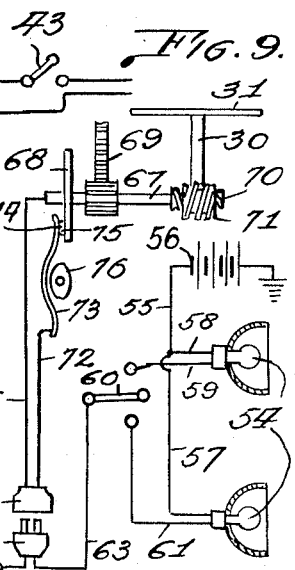
Fig. 9 is a diagrammatic view of the means employed for taking pictures with my improved apparatus during hours of darkness.

In Fig. 9 I have shown an arrangement whereby flash light pictures may be taken of a speeding vehicle during the hours of darkness, such means including a pair of conventional electric flash light lamps 54 that may be mounted on the front portion of the equipped vehicle, for instance, on the radiators, the front ends of the front fenders, or upon the front bumper.

A conductor 55 and a branch 58 thereof lead from a source of electric current supply, for instance, a battery 56, to one of the contacts of one of the flash lights and another branch conductor 57 leads to one of the contacts of the other flash lamp. Conductors 59 and 61 lead from the other contacts of the flash lamps to the spaced contacts of a conventional two-way switch 60.

Leading from the arm of switch 60 to a conventional plug 62 is a conductor 63 and the other side of said plug is grounded as designated by 64. The contact pins of plug 62 are adapted to enter a socket 65 and one of the contacts of said socket is by means of a conductor 66, grounded on a shaft 67 carrying a balance wheel 68 and which shaft 67 is driven from a gear wheel 69 forming a part of the shutter actuating mechanism.

Formed on shaft 67 is a worm 70 that engages a worm wheel 71, the latter being mounted on the shaft 30 that carries shutter 31.

The other contact of socket 65 is connected by a conductor 72 to one end of a spring contact arm 73 carrying on its free end a contact 74 that is adapted to engage a contact 75 that projects from balance wheel 68.

Associated with contact arm 73 is a throw-out eccentric 76, which latter is used for actuating the arm to open the contacts 74 and 75 while the apparatus for taking pictures at night or during the hours of darkness, is not in service.

Contact 75 is mounted on wheel 68 so that when the opening 32 in said shutter is within approximately eighteen or twenty per cent of full registration with the lens opening O and the opening in the film guide, it engages the contact 74 and thus there is a very short time interval between the time of such engagement and the time when the shutter opening 32 is in full registration with the opening O and the opening in the film guide G, such time interval being required for the lamps 54 to reach their light peak.

When taking pictures at night or during hours of darkness, the switch 43 is closed to start the film driving motor and to illuminate the interior of housing 37, and after plug 62 has been inserted in socket 65, switch 60 is moved into engagement with one of its contacts, thereby placing in circuit one of the flash lights, and as contact 75 engages contact 74 the circuit will be closed, thereby causing the flash light to function with the result that a flash light picture of the speeding car is taken. After a short lapse of time, for instance, two or three seconds, the switch is moved into engagement with its other contact, thereby placing in circuit the other flash lamp to cause the same to function as contact 75 engages contact 74. Thus two spaced flashes of light are produced that illuminate the speeding vehicle and enable spaced flash light exposures to be made on the moving film within the camera.

An alternative procedure for taking two flash light pictures of a speeding car is to first place switch 60 on one of its contacts and then close switch 43 so that, when contact 75 engages contact 74 the circuit to the flash light is closed, thus taking a picture. Switch 43 is now opened and switch 60 is shifted to the other one of its contacts, after which switch 43 is closed and the second flash light is energized and lighted as contact 75 engages contact 74.

The flash lamps 54 are provided with red ray filters for the protection of the eyes of the drivers of vehicles approaching the equipped vehicle, but such filters do not prevent the taking of clear flash light pictures of the speeding vehicle.

It is to be noted that I have illustrated and described the use of prisms 52 and 53 for transmitting images of the speedometer and chronometer to the film and while prisms are desirable for the reason that they combine clarity and accuracy in the transmission of light rays and thereby make a more perfect image, it will be understood that any suitable reflecting surfaces such as mirrors, may be used.

In my improved apparatus, the speed of a traveling vehicle or the like is determined by taking two or more pictures of said vehicle, each picture showing an image indicating the linear speed of the camera, the split second chronometer, as well as the image of the traveling vehicle.

In the finished pictures, the sizes of the photographed vehicle in both pictures may be readily compared and if the vehicle is the same size in both pictures, it indicates that the vehicle must have been traveling at the same speed as that of the camera or the vehicle upon which it is mounted.

Thus it is only necessary to show that the camera speed could not have been changed in the recorded or indicated interval, and, if the pictures show the vehicle smaller in one picture than in the other, then it is necessary to compare these pictures with pictures taken of a like vehicle at known distances in order to obtain the distance traveled in unit time, and this is then computed with the linear speed of the camera, if any. After the size of a vehicle is known at one distance, it is proportional at all other distances.

In cases where the difference in speed between the camera and the vehicle is great, error in time interval may be reduced by taking a motion picture of the vehicle and the images of the split second chronometer are used in place of testimony to prove to the court that sixteen, thirty-two, or forty-eight frames were exposed per second.

In order to prove the accuracy of the speedometer, the odometer readings which may register less than the regular tenth of a mile interval used on most speedometers, together with the elapsed time indicated, may be used.

Obviously, my improved apparatus may be advantageously employed for purposes other than determining speed, for instance, in the taking of pictures to determine the time and distance between violations of a speeding vehicle or any action where accurate space, time, or distance records are required.

Thus it will be seen that I have provided a photographic speed recording device that is relatively simple in construction, inexpensive of manufacture, capable of being easily and conveniently operated, and very effective in performing the functions for which it is intended.

It will be understood that minor changes in the size, form and construction of the various parts of my improved vehicle speed recording apparatus, may be made and substituted for those herein shown and described, without departing from the spirit of my invention, the scope of which is set forth in the appended claims.

I claim as my invention:

1. In a speed recording apparatus, the combination with a frame adapted to be rigidly fixed on a vehicle, of a camera removably mounted in said frame, and provided with a main lens and a film guide to the rear of said main lens, a secondary lens within the camera, between, to one side of, and with its axis at right angles to the axis of, the main lens and said film guide, a reflecting surface located in the camera adjacent said secondary lens for directing light rays therefrom onto the film passing through the film guide, a housing mounted on the side of said frame, at one side of the camera, speed registering means within said housing and spaced apart from the axis of the secondary lens, a reflecting surface within said housing between said speed registering means and said secondary lens, which reflecting surface is positioned so as to reflect, to said secondary lens, an image of said speed registering means and which frame, camera and housing are provided with aligned openings for transmitting the reflected light.

2. In a speed recording apparatus, the combination as set forth in claim 1 and with means for illuminating said speed registering means.

3. In a speed recording apparatus, the combination as set forth in claim 1 including a chronometer positioned adjacent said speed registering means, said reflecting surface within said housing, also reflecting an image of said chronometer.

4. In a speed recording apparatus, the combination as set forth in claim 1, including a chronometer positioned adjacent said speed registering means, said reflecting surface in said housing, also reflecting an image of said chronometer, and means for illuminating said speed registering means and chronometer.

5. In a speed recording apparatus, the combination with a frame adapted to be rigidly fixed to a vehicle, of a motion picture camera removably mounted in said frame, the latter provided with an opening of such size as to permit the ready insertion and removal of the camera through said opening, said camera having a main lens, a film guide, means for moving a film through said guide and a secondary lens located to one side of, and with its axis at right angles to, the axis of said main lens and film guide, a prism located adjacent said secondary lens for directing light rays from said secondary lens onto the film passing through the film guide, a housing attached to the side of said frame adjacent the camera, a speed registering device within said housing, said frame, camera and housing having aligned openings for the transmission of light to said secondary lens, a reflecting prism located in said housing between said speed registering device and said secondary lens for transmitting an image of the speed registering means through said aligned openings to the secondary lens and the first mentioned prism and electrically operated means for releasing the film moving means and for illuminating said speed registering device.

6. In a speed recording apparatus, the combination as set forth in claim 5 including a chronometer positioned adjacent said speed registering device and the image of which chronometer is reflected by the reflecting surface of said prism within said housing.

7. In a speed recording apparatus, the combination with a frame adapted to be secured to a vehicle, of a motion picture camera removably mounted within said frame, the latter provided with an opening of such size as to permit the ready insertion and removal of said camera through said opening, said camera having a main lens, a film guide and means for moving a film through said guide, a housing mounted on the side of said frame adjacent the camera, a speed registering device and a chronometer within said housing, a secondary lens in the camera having its axis parallel to the film guide, and a pair of reflecting prisms, one located in the camera in front of the film guide and on one side of said secondary lens, the other prism located on the opposite side of the secondary lens, within said housing and in front of said speed registering device and chronometer, and the walls of said camera, frame and housing having openings in alignment with said secondary lens and prisms.

8. In a speed recording apparatus, the combination as set forth in claim 7, with said chronometer located adjacent said speed registering device, and including means for illuminating said speed registering device and said chronometer.

9. The combination as set forth in claim 7, including means for illuminating said speed registering device and said chronometer and electrically operated means for causing the film moving means to operate and simultaneously rendering effective said illuminating means for said speed registering device and chronometer.

FRANK ABELL.